(12) United States Patent
Deivasigamani et al.

(10) Patent No.: US 11,473,857 B2
(45) Date of Patent: Oct. 18, 2022

(54) MODULAR EXHAUST

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 291 days.

(21) Appl. No.: 16/734,302

(22) Filed: Jan. 4, 2020

(65) Prior Publication Data
US 2021/0207899 A1 Jul. 8, 2021

(51) Int. Cl.
*F28F 7/00* (2006.01)
*F28F 17/00* (2006.01)
*F28F 27/00* (2006.01)

(52) U.S. Cl.
CPC ............ *F28F 17/005* (2013.01); *F28F 27/00* (2013.01)

(58) Field of Classification Search
CPC . F28F 17/005; F28F 27/00; F28B 9/08; E04F 17/02; E04F 17/04; F23J 11/02; F23J 13/04; F23J 2211/20; F23J 2213/20–204; F23J 2900/13004; F24H 8/006
See application file for complete search history.

(56) References Cited

U.S. PATENT DOCUMENTS

| | | | | |
|---|---|---|---|---|
| 1,869,939 A * | 8/1932 | Latimer | ............... | F24H 1/28 431/177 |
| 3,119,604 A * | 1/1964 | Biber | ............... | F26B 11/182 432/117 |
| 4,187,833 A * | 2/1980 | Zahora | ............... | F23J 11/02 110/193 |
| 4,481,935 A * | 11/1984 | Bawel | ............... | F23J 13/04 126/307 R |
| 4,603,680 A * | 8/1986 | Dempsey | ............... | F23J 13/04 126/99 A |
| 4,768,444 A * | 9/1988 | DeWerth | ............... | F23J 11/02 110/160 |
| 4,899,726 A * | 2/1990 | Waterman | ............... | F23L 17/005 126/110 R |
| 5,165,732 A * | 11/1992 | Townsend | ............... | F16L 13/163 126/307 R |
| 5,328,213 A * | 7/1994 | Barth | ............... | F16L 9/18 285/123.1 |
| 5,421,774 A * | 6/1995 | Specht | ............... | F23J 11/02 126/307 R |

(Continued)

*Primary Examiner* — Travis Ruby
(74) *Attorney, Agent, or Firm* — Tracy Jong Law Firm; Tracy P. Jong; Cheng Ning Jong (57) ABSTRACT

A modular exhaust configured for exhausting a flue flow of a heat exchanger, the modular exhaust including a cross tube including an inlet end, an exit end and a central axis, wherein the cross tube configured for receiving the flue flow at the inlet end and channeling the flue flow to the exit end; a condensate drainage exit aperture disposed on a bottom portion of the cross tube, the condensate drainage exit aperture configured for draining condensate from the first heat exchanger; and a vertical tube including a central axis, a top end and a bottom end, the cross tube configured to be connected at the exit end of the cross tube to a portion of the vertical tube disposed between the top end and the bottom end, the central axis of the cross tube is not disposed perpendicularly with respect to the central axis of the vertical tube.

15 Claims, 9 Drawing Sheets

(56) References Cited

U.S. PATENT DOCUMENTS

| | | | | |
|---|---|---|---|---|
| 6,000,391 | A * | 12/1999 | Timmons | F23J 11/02 110/160 |
| 6,216,685 | B1 * | 4/2001 | Payne | F23J 11/02 126/80 |
| 10,281,351 | B2 * | 5/2019 | Branecky | F23N 3/00 |
| 2005/0155535 | A1 * | 7/2005 | Rieke | F23J 13/00 110/349 |
| 2008/0072892 | A1 * | 3/2008 | Wawrla | F24H 8/006 126/307 R |
| 2008/0254729 | A1 * | 10/2008 | Stubbert | F23J 13/04 454/3 |
| 2010/0170452 | A1 * | 7/2010 | Ford | F24H 9/2035 122/14.21 |
| 2010/0267327 | A1 * | 10/2010 | Jacklich | F23J 13/04 454/237 |
| 2012/0272928 | A1 * | 11/2012 | Kameyama | F24H 1/28 122/19.2 |
| 2014/0209087 | A1 * | 7/2014 | Bertler | F23J 11/02 126/307 R |
| 2015/0316258 | A1 * | 11/2015 | Staller | F23J 11/08 454/1 |
| 2018/0185767 | A1 * | 7/2018 | Deivasigamani | B01D 53/346 |
| 2019/0203976 | A1 * | 7/2019 | Scott | F24H 8/006 |

* cited by examiner

MODULAR EXHAUST

BACKGROUND OF THE INVENTION

1. The Field of the Invention

The present invention relates to a heating system having an exhaust system having a modular component capable of handling condensates and exhaust while minimizing back pressure which occurs to the heating system. More specifically, the present invention is directed to a heating system having a modular multifunctional exhaust system capable of reducing back pressure exerted to a flue flow through the exhaust.

2. Background Art

Stainless steel exhausts or vent pipes are ubiquitous in the heating industry where combustion flue gases are channeled from burners disposed in indoor environments to outdoor environments. Although common, they can be costly to fabricate. This is especially true for those pieces that are curved, e.g., elbows, as they involve multiple cuts and crimps of stainless steel tubings, etc., in forming pieces constituting the exhausts. Further, for connecting two exhausts together, a stainless steel tee is required where the tee is constructed from two tubes disposed at right angle to one another. In many instances, no considerations were given to the effects of merging two flue flows disposed at substantially right angle. Further, if condensate drainage is required, the stainless steel exhausts or vent pipes are required to be modified with apertures each allowing condensate to be drained. Again, no considerations were given to the placement of the apertures on the exhausts except the apertures are simply preferably disposed at a lower portion of a horizontally-disposed stainless steel tube where condensate is likely to collect.

There exists a need for an exhaust or vent pipe for a flue-generating device that minimizes back pressure exerted to the device while allowing another flue flow to be merged with the flue flow from the device. There exists a need for a modular exhaust that provides all of the features required of a high efficiency flue-generating device where the modular exhaust allows rapid installation and deployment of a shared exhaust system.

SUMMARY OF THE INVENTION

In accordance with the present invention, there is provided a modular exhaust configured for exhausting a flue flow of a first heat exchanger, the modular exhaust including:
 (a) a cross tube including an inlet end, an exit end and a central axis, wherein the cross tube is configured for receiving the flue flow at the inlet end and channeling the flue flow to the exit end;
 (b) a condensate drainage exit aperture disposed on a bottom portion of the cross tube, wherein the condensate drainage exit aperture is configured for draining condensate from the first heat exchanger; and
 (c) a vertical tube including a central axis, a top end and a bottom end, wherein the cross tube is configured to be connected at the exit end of the cross tube to a portion of the vertical tube disposed between the top end and the bottom end of the vertical tube, the central axis of the cross tube is not disposed perpendicularly with respect to the central axis of the vertical tube such that a flue flow from a second heat exchanger is facilitated through the vertical tube of the first modular exhaust, reducing back pressure in the flue flow from the first heat exchanger through the cross tube.

In one embodiment, the exit end of the cross tube is disposed at a level higher than the condensate drainage exit aperture to reduce the amount of inadvertent escape of condensate through the modular exhaust. In one embodiment, the exit end of the cross tube is disposed at a level higher than the condensate drainage exit aperture by about ½ inch to reduce the amount of inadvertent escape of condensate through the modular exhaust. In one embodiment, the modular exhaust further includes a temperature sensor disposed within the cross tube, wherein the temperature sensor is configured for sensing the temperature of the flue flow through the cross tube. In one embodiment, the cross tube and the vertical tube are disposed such that the central axis of the cross tube is disposed at an angle of from about 45 degrees to about 70 degrees with respect to the central axis of the vertical tube. In one embodiment, the vertical tube includes at least one of a male portion and a female portion to facilitate connection of the vertical tube with another exhaust segment.

In accordance with the present invention, there is provided a heating system including:
 (a) a first heat exchanger including a first modular exhaust including a condensate drainage exit aperture, a cross tube and a vertical tube, wherein the condensate drainage exit aperture is configured for draining condensate from the first heat exchanger, the cross tube includes an inlet end, an exit end and a central axis, the vertical tube includes a central axis, a top end and a bottom end and the cross tube is configured to be connected at the exit end of the cross tube to a portion of the vertical tube between the top end and the bottom end of the vertical tube and the central axis of the cross tube is not disposed perpendicularly with respect to the central axis of the vertical tube;
 (b) a second heat exchanger including a second modular exhaust including a vertical tube including a top end; and
 (c) a connecting tube including a top end and a bottom end,
wherein the connecting tube is configured to be connected at the top end of the connecting tube to the first modular exhaust at the bottom end of the vertical tube of the first modular exhaust and the connecting tube is configured to be connected at the bottom end of the connecting tube to the second modular exhaust at the top end of the vertical tube of the second modular exhaust and a flue flow from the second heat exchanger is facilitated through the vertical tube of the second heat exchanger, the connecting tube and the vertical tube of the first heat exchanger, reducing back pressure to a flue flow from the first heat exchanger.

In one embodiment, the exit end of the cross tube is disposed at a level higher than the condensate drainage exit aperture to reduce the amount of inadvertent escape of condensate through the first modular exhaust.

In one embodiment, the second modular exhaust further includes a condensate drainage exit aperture for draining condensate from the second heat exchanger. In one embodiment, the first modular exhaust further includes a temperature sensor disposed within the cross tube, wherein the temperature sensor is configured for sensing the temperature of the flue flow through the cross tube.

An object of the present invention is to provide an exhaust that minimizes back pressure to its flue flow when it is merged with another flue flow to form a resultant flue flow that is a combination of the two flue flows.

Another object of the present invention is to provide a combined exhaust and condensate drainage exit aperture.

Another object of the present invention is to provide a combined exhaust and condensate drainage exit aperture that reduces the amount of inadvertent escape of condensate through the exhaust.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—heating system
4—recirculation port
6—water inlet port
8—modular exhaust
10—modular exhaust
12—cross tube
14—cross tube incline
16—condensate drainage exit aperture
18—groove
20—O ring seal
22—height of condensate drainage exit aperture lip
24—flange
26—top heat exchanger
28—bottom heat exchanger
30—lip
32—vertical tube
34—condensate flow
36—connecting tube
38—hot water outlet port
40—cold water supply conductor
42—water inlet port
44—condensate drainage tube
46—fresh air intake port
48—exhaust outlet port
50—door
52—heating unit controller
54—cold water supply conductor
56—recirculation conductor
58—blower
60—temperature sensor
62—support bar
64—inlet end of cross tube
66—exit end of cross tube
68—central axis of cross tube
70—central axis of vertical tube
72—connecting tube
74—air flow
76—flue flow
78—inner diameter of condensate drainage exit aperture Particular Advantages of the Invention The present invention is directed to an exhaust of a heat exchanger that is multifunctional and capable of reducing back pressure exerted to the flue flow through the exhaust. The present invention removes the need for a dedicated exhaust for each heating unit while minimizing the negative effects of a combined exhaust. In addition to the function of providing a means for directing flue flow from a heat exchanger in a direction to merge with an upstream flue flow to avoid creating inadvertent flue flow back pressure to the heat exchanger, the present modular exhaust further includes a condensate drain exit aperture for directing condensates out of the flue flow exhaust of heat exchanger as early as possible. In one embodiment, the exhaust and condensate drain exit aperture are constructed as a single modular unit, thereby reducing the need for multiple discrete components and simplifying the installation of the exhaust portion of a combustion-based heating system.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
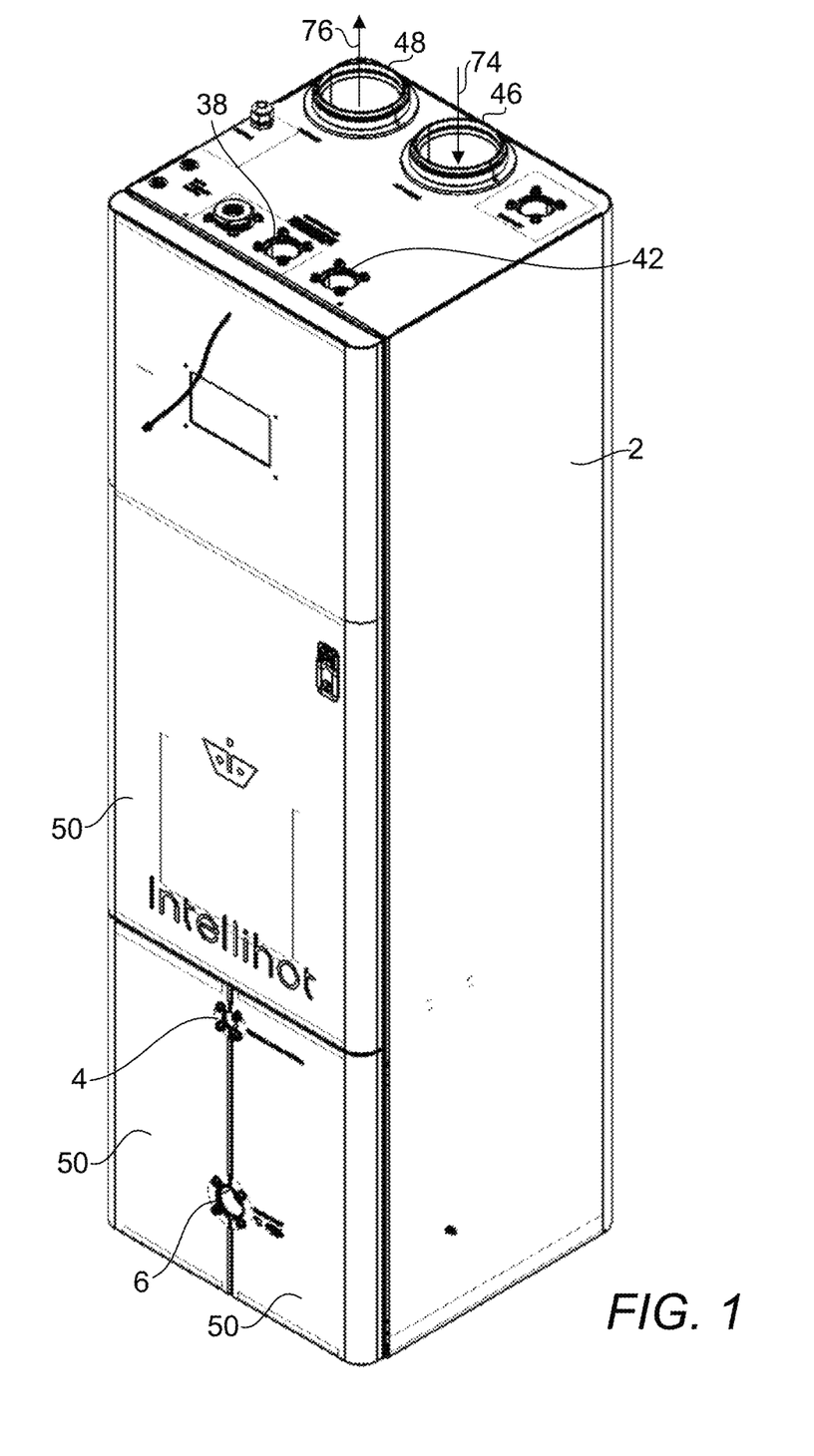
FIG. 1 is a top front perspective view of a heating system.
Figure 2:
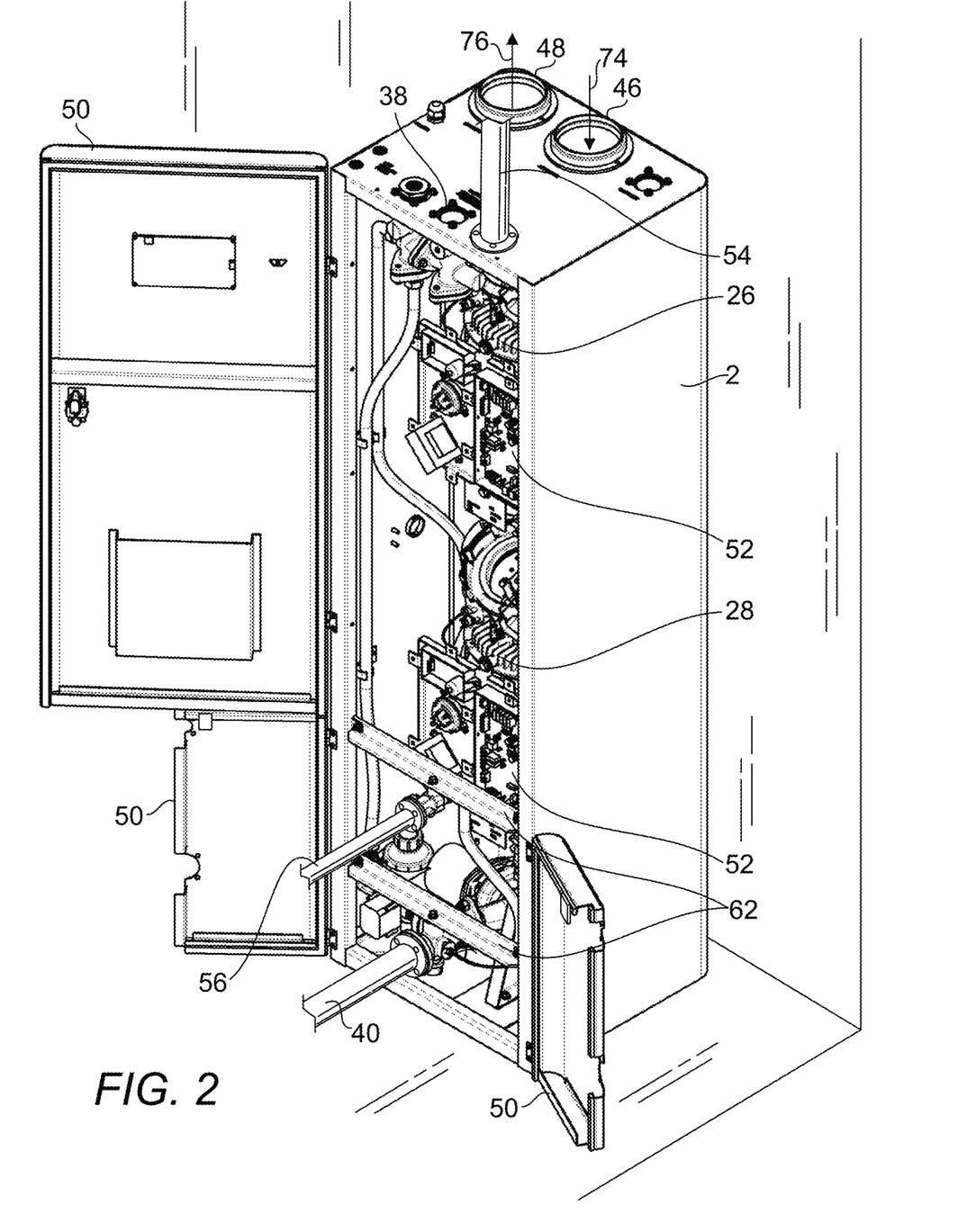
FIG. 2 is a top front perspective view of the heating system of FIG. 1 with the exception that its doors have now been disposed in an open state to reveal the heating units of the heating system.
Figure 3:
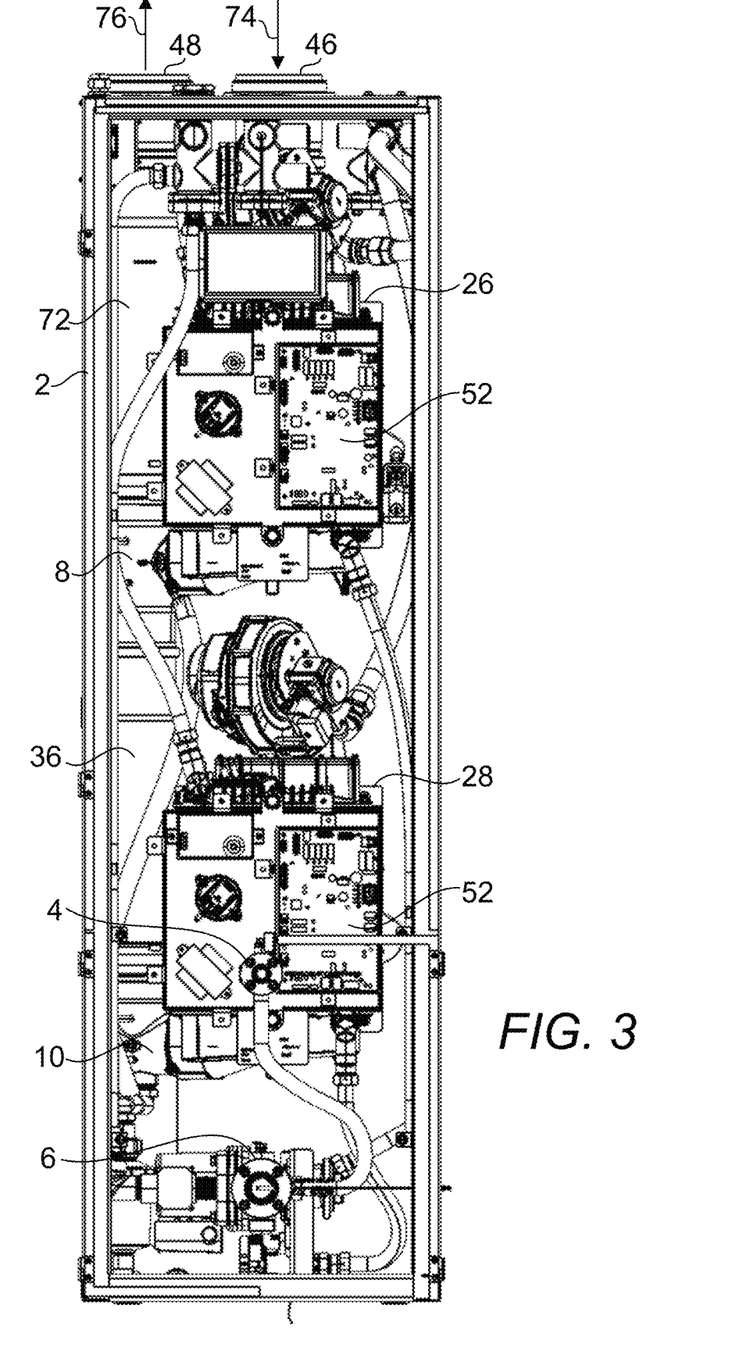
FIG. 3 is a front view of the heating system of FIG. 2 with the doors and support bars of and conductors connected to the water inlet port and recirculation port removed to more clearly reveal the heating units of the heating system.
Figure 4:
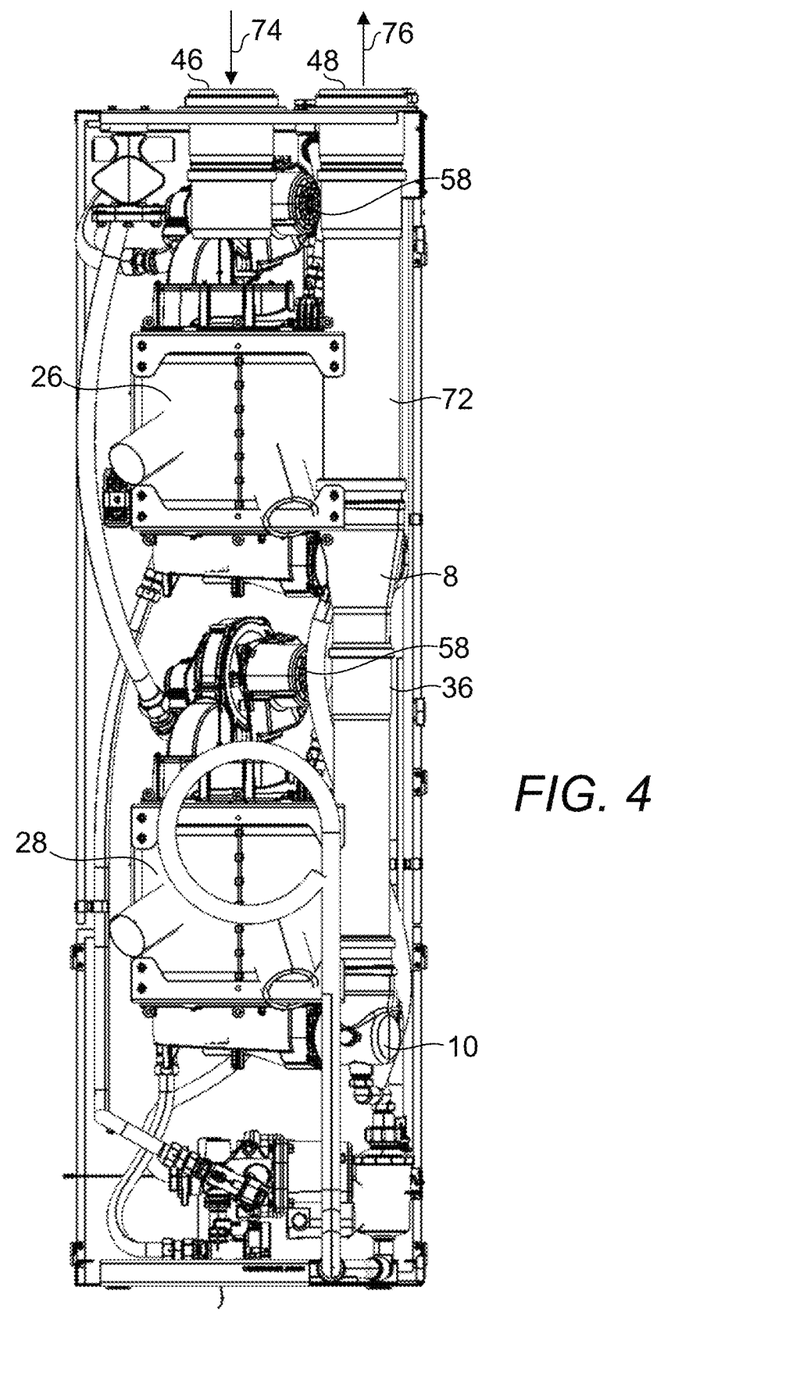
FIG. 4 is a rear view of the heating system of FIG. 3.
Figure 5:
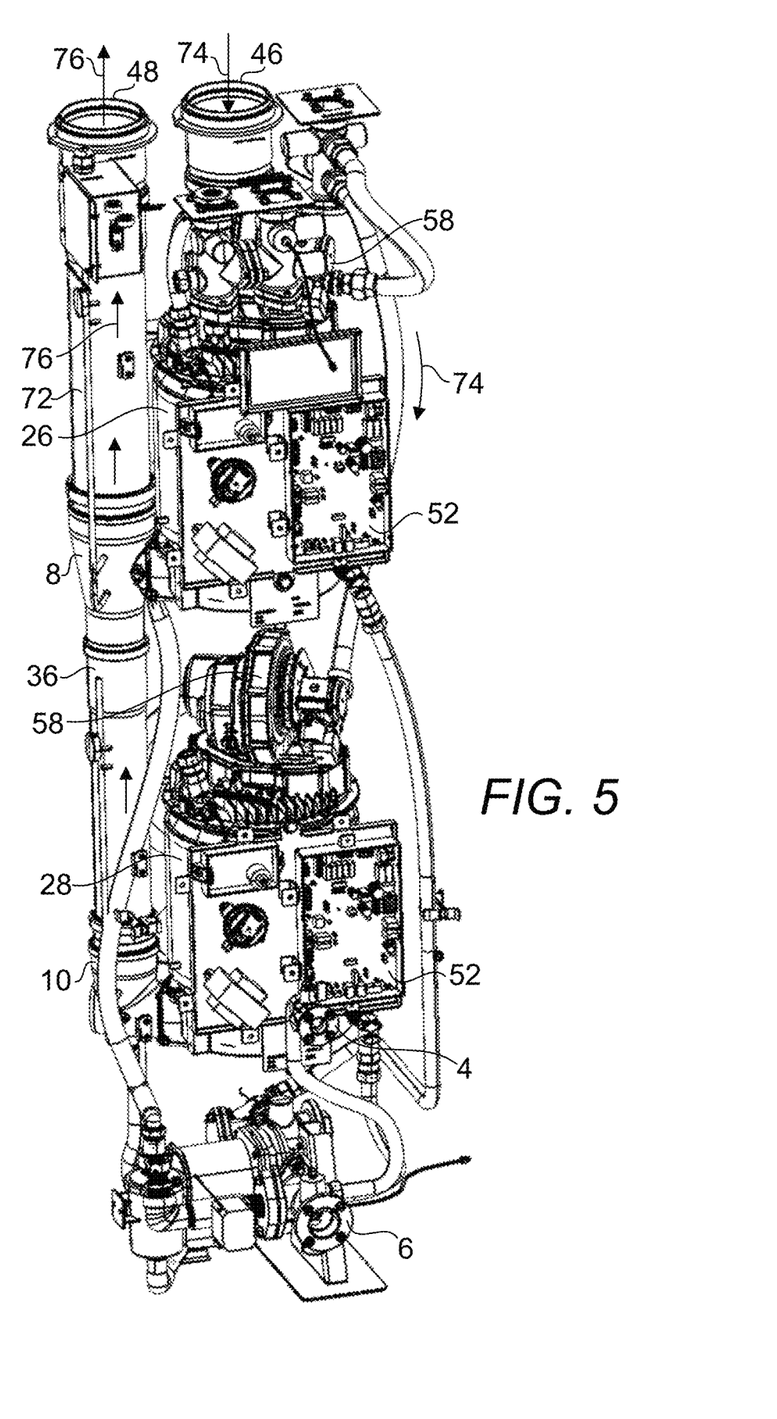
FIG. 5 is a top front view of the heating system of FIG. 4 with the support frame of the heating system further removed to more particularly point out the heating units disposed therein.

FIG. 1 is a top front perspective view of a heating system 2. FIG. 2 is a top front perspective view of the heating system of FIG. 1 with the exception that its doors have now been disposed in an open state to reveal the heating units of the heating system 2. FIG. 3 is a front view of the heating system of FIG. 2 with the doors 50 and support bars 62 of and conductors 40, 56 connected to the water inlet port 6 and recirculation port 4 removed to more clearly reveal the heating units of the heating system. FIG. 4 is a rear view of the heating system of FIG. 3. There are two heating units each including a heat exchanger 26, 28. Heat exchanger 26 is disposed above heat exchanger 28 to form a vertical compact configuration for the multi-heating unit heating system 2 housed in a single enclosure. FIG. 5 is a top front view of the heating system of FIG. 4 with the support bars 62 of the heating system further removed to more particularly point out the heating units disposed therein. In one mode, when a supply of heated water is required, cold water is drawn through port 6 via conductor 40 or port 42 via conductor 54 to be heated via at least one of the heat exchangers 26, 28 and supplied at hot water outlet port 38 and eventually delivered to one or more points of use via a conductor connected to the hot water outlet port 38. In another mode, when a heated recirculation flow through a recirculation conductor 56 is desired, at least one of the heating units will be required. When heating is desired, air is drawn through an intake port 46 disposed on the top surface of the heating system by a blower 58 coupled to a heating unit and mixed with a fuel for combustion in the heating unit, the operation of which is controlled by means of a controller 52. As flue develops upon combustion, the same blower 58 urges the flue gas to form a flue flow which continues through a heat exchanger 26, 28 and a modular exhaust 8, 10 and proceeds to exit the heating system 2 via an exhaust outlet port 48.

Figure 6:
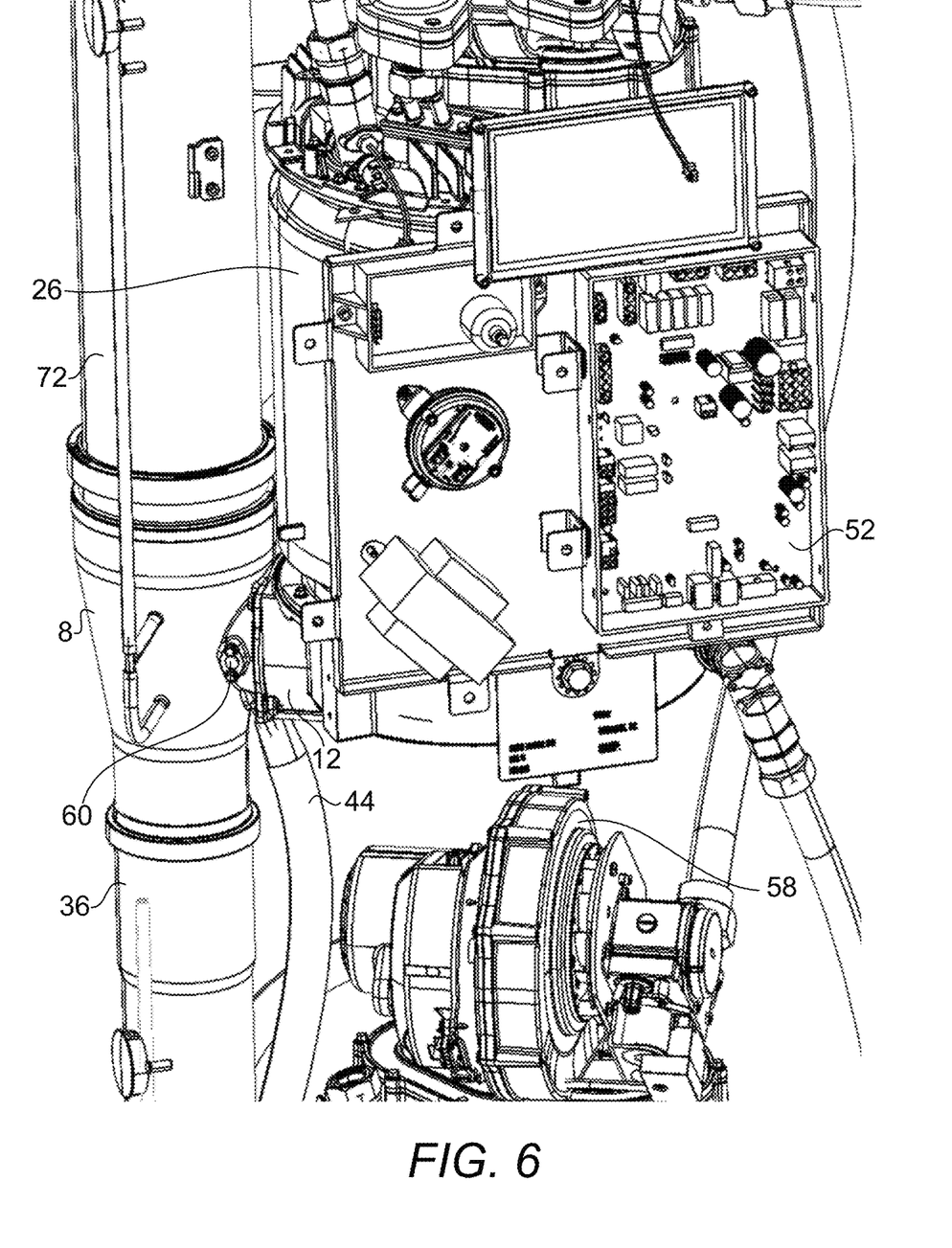
FIG. 6 is a close-up top front view of a modular exhaust disposed within the heating system shown in FIG. 5.
Figure 7:
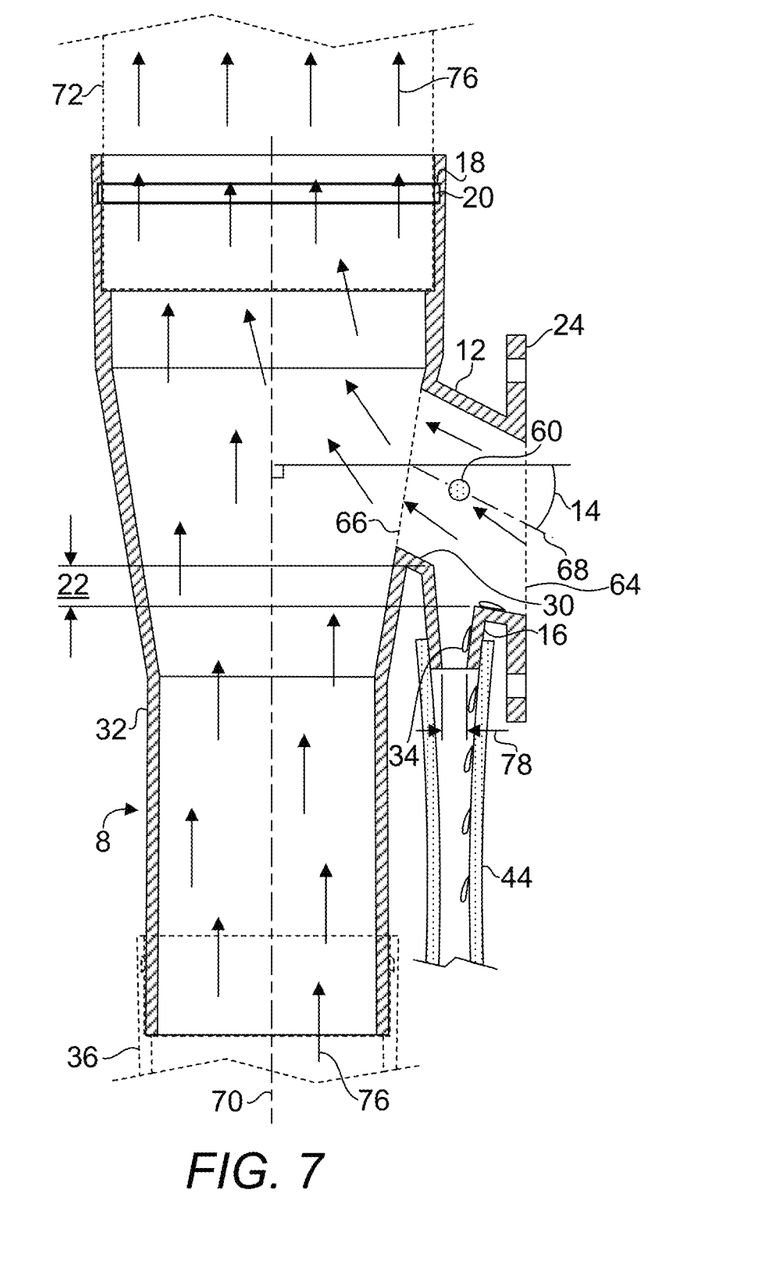
FIG. 7 is a front cross-sectional view of one embodiment of a modular exhaust of a heat exchanger.
Figure 8:
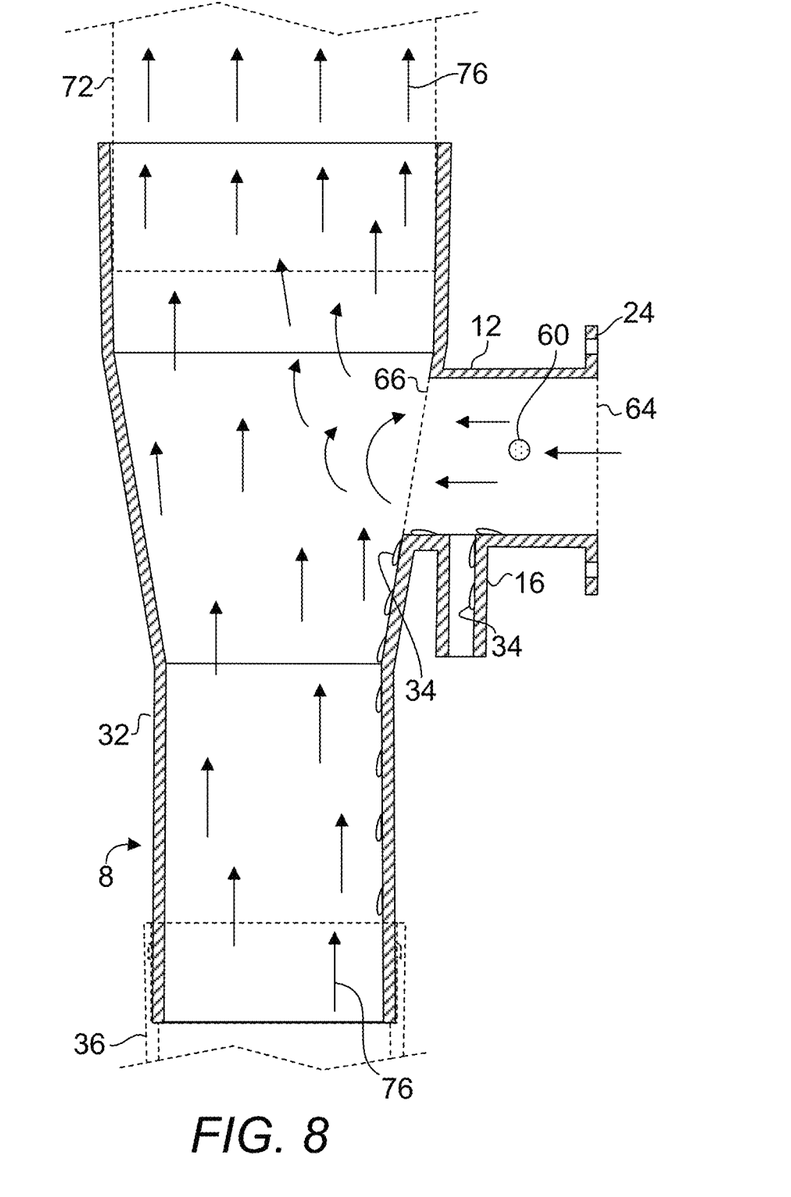
FIG. 8 is a front cross-sectional view of another embodiment of a modular exhaust of a heat exchanger.

FIG. 6 is a close-up top front view of a modular exhaust 8 disposed within the heating system 2 shown in FIG. 5. FIG. 7 is a front cross-sectional view of one embodiment of a modular exhaust 8 of a heat exchanger, e.g., heat exchanger 26 shown in FIG. 6. The modular exhaust 8 is configured for receiving the flue flow exhaust of a first gas-fired heat exchanger 26 at the inlet end 64 of a cross tube 12, merging it with the flue flow exhaust of a second gas-fired heat exchanger 28 at an incline 14. As the cross tube 12 is disposed at an incline with respect to the vertical tube 32, i.e., the central axis 68 of cross tube 12 is not disposed perpendicularly or at right angle with respect to the central axis 70 of vertical tube 32. This allows the flue gas exhaust received of the first heat exchanger 26 to merge smoothly and freely with the flue flow received of the second heat exchanger 28 by minimizing a back pressure to the flue flow in the first heat exchanger 26 that can be imparted by the flue flow exhaust received of the second heat exchanger. If the flue flow exhaust from the cross tube 12 had been introduced into a vertical tube 32 within which a flue flow is also received from the second heat exchanger 28, at right angle, as shown in FIG. 8, the back pressure created in the flue flow through cross tube 12 would negatively affect the heat transfer operation of the first heat exchanger 26 from the flue flow to the water flow in the heat exchanger 26. Referring to FIG. 7, the cross tube 12 is biased slightly upwardly in the direction of flue flow in the vertical tube 32 such that the flue flow exhaust of the top heat exchanger 26 has already achieved a sufficient and suitable vertical component in its velocity upon arriving at the exit end 66 of the cross tube 12 and the flow can be merged smoothly with the flue flow of the bottom heat exchanger 28 that flows through the vertical tube 32, reducing the back pressure caused in the exhaust of the top heat exchanger 26.

The modular exhaust 8 further includes a condensate drainage exit aperture 16 for allowing a condensate flow 34 to exit the modular exhaust prior to the drop-off into the conductor through which the flue flow exhaust from second heat exchanger 28 is configured to flow through and this condensate flow is to be collected elsewhere and discarded, e.g., through a condensate neutralizer. For ideal combustion in a heating unit, it is advantageous for the flue flow generated by the heating unit to exit the heating unit with the lowest pressure drop possible. In order to achieve the lowest pressure drop in the flue flow, the condensate generated in the heating unit shall be drained and removed as early as possible, e.g., at the aperture 16 and out of the heating unit without being inadvertently carried to a location past the aperture 16 in the cross tube 12.

In use, a drainage tube 44 is connected to the aperture 16 to channel condensate to a suitable drain. There is further provided a lip 30 between the condensate drainage exit aperture 16 and the vertical tube 32 where the lip 30 is disposed at a level higher than the condensate drainage exit aperture 16 which prevents condensate from being drawn into the flue flow from the second heat exchanger in the vertical tube 32. In other words, the first modular exhaust 8 includes a condensate drainage exit aperture 16, a cross tube 12 and a vertical tube 32. The condensate drainage exit aperture 16 is configured for draining condensate from the first heat exchanger 26, the cross tube 12 includes an inlet end 64 and an exit end 66 where the cross tube 12 is configured for receiving a flue flow from the first heat exchanger 26 at the inlet end 64 and the vertical tube 32 includes a top end and a bottom end. The cross tube 12 is configured to be connected at the exit end 66 of the cross tube 12 to a portion of the vertical tube 32 between the top end and bottom end of the vertical tube 32. The cross tube 12 incline 14 preferably ranges from about 20 to about 45 degrees. Therefore, the cross tube 12 and the vertical tube 32 are disposed such that the central axis 68 of cross tube 12 is disposed at an angle of from about 45 (90−45) degrees to about 70 (90−20) degrees with respect to the central axis 70 of vertical tube 32. In one embodiment, the height 22 of the lip 30 measures from about ½ inch to about ¾ inch. In order to facilitate mounting of the modular exhaust to a heat exchanger, a flange 24 with suitable through holes is provided on the inlet end 64 of the modular exhaust 8 that is configured to receive exhaust from the first heat exchanger 26. Suitable gaskets may be required to create a leak-free connection between this inlet end and a matching flange of the first heat exchanger. Each of the top and bottom ends of the vertical tube 32 is connected to its matching connecting tube 36, 72, via the insertion of a male portion to a female portion, facilitating connection of the vertical tube 32 to other segments of the exhaust system which terminates at the exhaust outlet port 48. The bottom end of the vertical tube 32 is configured to be a male portion which tapers inwardly to form an end with an outer diameter smaller than the inner diameter of the top end of connecting tube 36 while the outlet end of the vertical tube 32 is configured to be a female portion which receives a connecting tube 72 with a mating end that tapers inwardly. A groove 18 disposed on the outlet end of the vertical tube 32 is useful for receiving an O ring seal 20 disposed therein. A matching connecting tube 72 can then be connected with the modular exhaust 8 by inserting the male portion of the connecting tube 72 into the top end of the vertical tube 32, compressing the 0 ring seal against the groove 18 of the top end of the vertical tube 32 to form a tight seal between the vertical tube 32 and connecting tube 72. Referring to FIG. 7, there is further provided a temperature sensor 60 useful for sensing the temperature of the flue flow in the cross tube 12 of the modular exhaust 8. The temperature sensor 60 is preferably disposed along the central axis of the cross tube 12 such that the temperature obtained of the flue is more representative of the flue flow temperature. In one embodiment, the flue flow temperature is useful for indicating whether its corresponding heating unit is operating at a desired efficiency. It shall be noted that the temperature sensor 60 is disposed within the cross tube 12 instead of the vertical tube 32 as the temperature sensor 60 disposed in the cross tube 12 reflects the temperature of the flue flow from the first or top heating unit only. In one embodiment, the inner diameter 78 of the condensate drainage exit aperture 16 is about ½ inch, a diameter sufficiently large to accommodate condensate from a high efficiency condensing heating unit.

FIG. 8 is a front cross-sectional view of another embodiment of a modular exhaust 8 of a heat exchanger 26. Note in FIG. 8 that no lip is provided to prevent inadvertent disposal of condensate down along the vertical tube 32. Although this modular exhaust 8 can achieve its function as a means to channel a flue flow out of a heating unit, the lack of an incline of the cross tube with respect to the vertical tube fails to reduce a back pressure exerted on the flue flow therein. Further, without a lip disposed on an edge of the aperture 16, condensate 34 may inadvertently enter the vertical tube 32 instead of being properly drained through the aperture 16.

Figure 9:
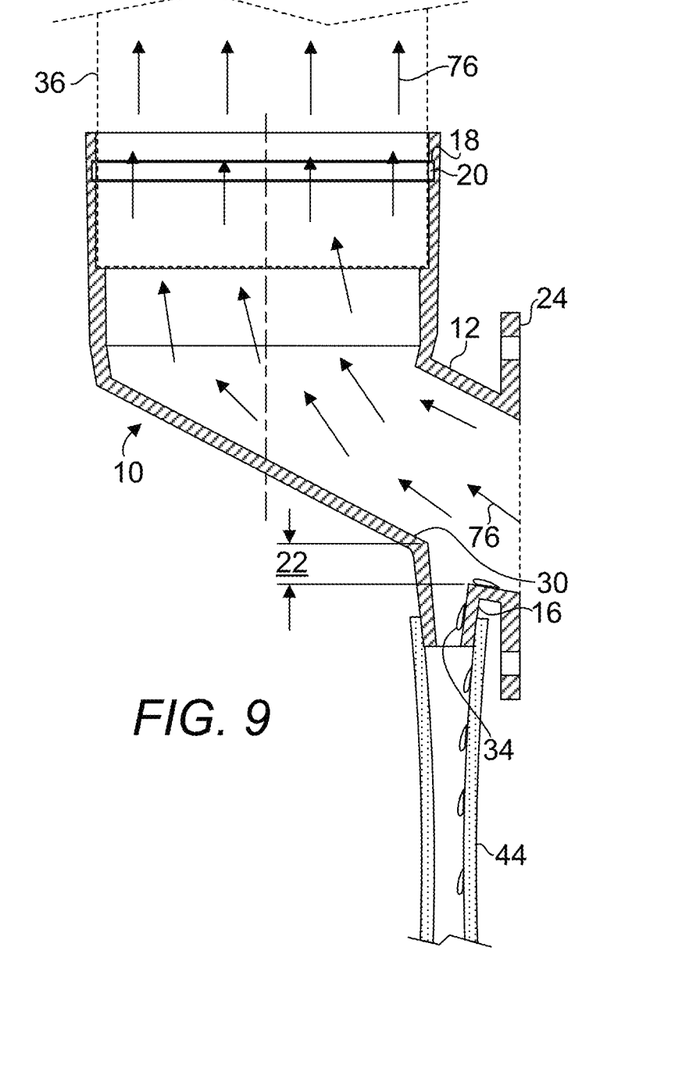
FIG. 9 is a front cross-sectional view of one embodiment of a modular exhaust of a heat exchanger.

FIG. 9 is a front cross-sectional view of one embodiment of a modular exhaust 10 of a heat exchanger. Here, the modular exhaust 10 need not receive flue flows of more than one heat exchanger but rather the flue flow 76 sent through modular exhaust 10 will merge with the flue flow from modular exhaust 8 upon traversing connecting tube 36. Again, there is further provided a lip 30 on the downstream edge of the condensate drainage exit aperture 16 where the lip 30 is disposed at a level higher than the condensate drainage exit aperture 16 which prevents condensate from being drawn into the portion of the exhaust past the condensate drainage exit aperture 16. In one embodiment, the height 22 of the lip 30 measures from about ½ inch to about ¾ inch.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A modular exhaust configured for exhausting a flue flow of a first heat exchanger, said modular exhaust comprising:
   (a) a cross tube comprising an inlet end, an exit end, a first floor disposed on a bottom portion of said cross tube at said inlet end, a second floor disposed on a bottom portion of said cross tube at said exit end and a central axis, wherein said cross tube is configured for receiving the flue flow at said inlet end and channeling the flue flow to said exit end and said first floor is configured to be disposed in a first incline;
   (b) a condensate drainage exit aperture disposed on a bottom portion of said cross tube, said condensate drainage exit aperture comprising a wall, wherein said condensate drainage exit aperture is configured for draining condensate from the first heat exchanger;
   (c) a vertical tube comprising a central axis, a top end and a bottom end; and
   (d) a lip disposed on said second floor between said condensate drainage exit aperture and said vertical tube, said lip is configured to be disposed in a second incline,
wherein said cross tube is configured to be connected at said exit end of said cross tube to a portion of said vertical tube disposed between said top end and said bottom end of said vertical tube, said central axis of said cross tube is not disposed perpendicularly with respect to said central axis of said vertical tube such that a flue flow from a second heat exchanger is facilitated through said vertical tube of the first modular exhaust, reducing back pressure in the flue flow from the first heat exchanger through said cross tube and said second incline is configured to be more severe than said first incline to expose an inner portion of said wall to prevent a condensate from being drawn into the flue flow from the second heat exchanger in said vertical tube.

2. The modular exhaust of claim 1, wherein said exit end of said cross tube is disposed at a level higher than said condensate drainage exit aperture to reduce the amount of inadvertent escape of condensate through said modular exhaust.

3. The modular exhaust of claim 1, wherein said exit end of said cross tube is disposed at a level higher than said condensate drainage exit aperture by at least about ½ inch to reduce the amount of inadvertent escape of condensate through said modular exhaust.

4. The modular exhaust of claim 1, further comprising a temperature sensor disposed within said cross tube, wherein said temperature sensor is configured for sensing the temperature of the flue flow through said cross tube.

5. The modular exhaust of claim 1, wherein said cross tube and said vertical tube are disposed such that said central axis of said cross tube is disposed at an angle of from about 45 degrees to about 70 degrees with respect to said central axis of said vertical tube.

6. The modular exhaust of claim 1, wherein said vertical tube comprises at least one of a male portion and a female portion to facilitate connection of said vertical tube with another exhaust segment.

7. The modular exhaust of claim 1, wherein said condensate drainage exit aperture is configured to extend downwardly to a tube configured for attachment of a drainage tube.

8. A heating system comprising:
(a) a first heat exchanger comprising a first modular exhaust comprising a condensate drainage exit aperture, a cross tube, a lip and a vertical tube, wherein said condensate drainage exit aperture is configured for draining condensate from said first heat exchanger, said cross tube comprises an inlet end, an exit end, a first floor disposed on a bottom portion of said cross tube at said inlet end, a second floor disposed on a bottom portion of said cross tube at said exit end and a central axis, said vertical tube comprises a central axis, a top end and a bottom end and said cross tube is configured to be connected at said exit end of said cross tube to a portion of said vertical tube between said top end and said bottom end of said vertical tube, said central axis of said cross tube is not disposed perpendicularly with respect to said central axis of said vertical tube, said first floor is configured to be disposed in a first incline, said condensate drainage exit aperture comprises a wall and said lip is configured to be disposed on said second floor between said condensate drainage exit aperture and said vertical tube, said lip is configured to be disposed in a second incline;
(b) a second heat exchanger comprising a second modular exhaust comprising a vertical tube comprising a top end; and
(c) a connecting tube comprising a top end and a bottom end, wherein said connecting tube is configured to be connected at said top end of said connecting tube to said first modular exhaust at said bottom end of said vertical tube of said first modular exhaust and said connecting tube is configured to be connected at said bottom end of said connecting tube to said second modular exhaust at said top end of said vertical tube of said second modular exhaust, a flue flow from said second heat exchanger is facilitated through said vertical tube of said second heat exchanger, said connecting tube and said vertical tube of said first heat exchanger, reducing back pressure to a flue flow from said first heat exchanger and said second incline is configured to be more severe than said first incline to expose an inner portion of said wall to prevent a condensate from being drawn into the flue flow from the second heat exchanger in said vertical tube of said first heat exchanger.

9. The heating system of claim 8, wherein said exit end of said cross tube is disposed at a level higher than said condensate drainage exit aperture by at least about ½ inch to reduce the amount of inadvertent escape of condensate through said first modular exhaust.

10. The heating system of claim 8, wherein said exit end of said cross tube is disposed at a level higher than said condensate drainage exit aperture to reduce the amount of inadvertent escape of condensate through said first modular exhaust.

11. The heating system of claim 8, wherein second modular exhaust further comprises a condensate drainage exit aperture for draining condensate from said second heat exchanger.

12. The heating system of claim 8, further comprising a temperature sensor disposed within said cross tube, wherein said temperature sensor is configured for sensing the temperature of the flue flow through said cross tube.

13. The heating system of claim 8, wherein said cross tube and said vertical tube are disposed such that said central axis of said cross tube is disposed at an angle of from about 45 degrees to about 70 degrees with respect to said central axis of said vertical tube.

14. The heating system of claim 8, wherein said vertical tube comprises at least one of a male portion and a female portion to facilitate connection of said vertical tube with another exhaust segment.

15. The heating system of claim 8, wherein said condensate drainage exit aperture is configured to extend downwardly to a tube configured for attachment of a drainage tube.

* * * * *